United States Patent
Yanagi

(10) Patent No.: US 11,008,218 B2
(45) Date of Patent: May 18, 2021

(54) MULTILAYERED GRAPHENE DISPERSION, BLACKENING AGENT FOR THERMOPHYSICAL PROPERTY MEASUREMENT, AND MOLD RELEASE AGENT/LUBRICANT FOR POWDER SINTERING

(71) Applicant: Tokyo Metropolitan Industrial Technology Research Institute, Tokyo (JP)

(72) Inventor: Shohan Yanagi, Tokyo (JP)

(73) Assignee: TOKYO METROPOLITAN INDUSTRIAL TECHNOLOGY RESEARCH INSTITUTE, Tokyo (JP)

( * ) Notice: Subject to any disclaimer, the term of this patent is extended or adjusted under 35 U.S.C. 154(b) by 0 days.

(21) Appl. No.: 16/074,846

(22) PCT Filed: May 29, 2017

(86) PCT No.: PCT/JP2017/019888
§ 371 (c)(1),
(2) Date: Aug. 2, 2018

(87) PCT Pub. No.: WO2017/209039
PCT Pub. Date: Dec. 7, 2017

(65) Prior Publication Data
US 2019/0039906 A1    Feb. 7, 2019

(30) Foreign Application Priority Data

May 31, 2016  (JP) .............................. JP2016-109516

(51) Int. Cl.
*C01B 32/194* (2017.01)
*G01N 25/18* (2006.01)

(52) U.S. Cl.
CPC ........... *C01B 32/194* (2017.08); *G01N 25/18* (2013.01); *C01B 2204/04* (2013.01);
(Continued)

(58) Field of Classification Search
CPC ... C01B 32/194; G01N 25/18; C01P 2004/84; C01P 2004/03; C01P 2204/32; C01P 2204/24; C01P 2204/04
See application file for complete search history.

(56) References Cited

U.S. PATENT DOCUMENTS

| | | | |
|---|---|---|---|
| 2008/0023396 | A1 | 1/2008 | Fugetsu |
| 2016/0064726 | A1 | 3/2016 | Ikenuma et al. |

FOREIGN PATENT DOCUMENTS

| | | |
|---|---|---|
| JP | 2014-9104 | 1/2014 |
| JP | 2016-843 | 1/2016 |

(Continued)

OTHER PUBLICATIONS

International Search Report dated Jul. 18, 2017 in International Application No. PCT/JP2017/019888.
(Continued)

*Primary Examiner* — Taiwo Oladapo
(74) *Attorney, Agent, or Firm* — Wenderoth, Lind & Ponack, L.L.P.

(57) ABSTRACT

The present invention provides a multilayered graphene dispersion capable of instantaneously forming a thin uniform coating film containing multilayered graphene on the surface of a sample, a blackening agent for thermophysical property measurement excellent in a blackening effect, and a mold release agent/lubricant for powder sintering excellent in releasing and lubrication effects. The multilayered graphene dispersion of the present invention is characterized in that multilayered graphene is dispersed in a liquid phase containing an organic solvent and a liquefied gas. The blackening agent for thermophysical property measurement of the present invention is a blackening agent for forming a blackened film on the surface of a sample for thermophysical property measurement, and contains the multilayered graphene dispersion. The mold release agent/lubricant for powder sintering of the present invention is a mold release agent/lubricant for forming a separation layer between a (Continued)

sintering mold and a sintered body in powder sintering, and contains the multilayered graphene dispersion.

15 Claims, 12 Drawing Sheets

(52) U.S. Cl.
CPC ...... *C01B 2204/24* (2013.01); *C01B 2204/32* (2013.01); *C01P 2004/03* (2013.01); *C01P 2004/84* (2013.01)

(56) References Cited

FOREIGN PATENT DOCUMENTS

| | | |
|---|---|---|
| JP | 2016-47777 | 4/2016 |
| JP | 2016047777 A * | 4/2016 |

OTHER PUBLICATIONS

Haruhiko Numajiri et al., "Influence of Blackening Treatment on Thermal diffusivity measurement", Tokyo Metropolitan Industrial Technology Research Center Research Report, No. 10, 2015, and its English translation of pertinent portion.

* cited by examiner

MULTILAYERED GRAPHENE DISPERSION, BLACKENING AGENT FOR THERMOPHYSICAL PROPERTY MEASUREMENT, AND MOLD RELEASE AGENT/LUBRICANT FOR POWDER SINTERING

RELATED APPLICATION

This application is a national stage entry of PCT/JP2017/019888, filed May 29, 2017, which claims priority of Japanese Patent Application No. 2016-109516, filed May 31, 2016, which are incorporated by reference in their entirety.

TECHNICAL FIELD

The present invention relates to a multilayered graphene dispersion, a blackening agent for thermophysical property measurement, and a mold release agent/lubricant for powder sintering.

BACKGROUND ART

Conventionally, it is considered to be very important to grasp the thermal conductivity of a material, and a flash method capable of measuring the thermal conductivity in a short time is widely used in various research institutions, universities, and the like including production sites.

In this flash method, it is necessary to blacken both sides of a sample in order to increase the absorptivity of pulse heating light for a sample having high transparency or a sample whose surface is white or mirror surface and difficult to absorb light. Although this blackening treatment is important work in the thermophysical property measurement, no blackening agent has been developed, and commercially available aerosol type graphite and lubricant are currently diverted.

Conventionally, as for a blackening agent, a technique for thermophysical property measurement, and a technique for powder sintering, the following techniques are disclosed.

Patent Literature 1 discloses that the surface of a sample for thermophysical property measurement is first spin-coated with a metal film as necessary, and a blackened film is formed thereon by spin coating using a liquid containing carbon black such as liquid sum/(Japanese black ink), thereby improving measurement accuracy.

However, an apparatus for spin coating is required, work is complicated, and surface treatment on a small test piece is difficult.

Patent Literature 2 discloses a method of measuring thermal diffusivity using a half spherical mirror type laser flash system, in which the thermal diffusivity is measured without coating a sample with black paint by returning the reflected light of laser beam applied onto the surface of the sample to the surface of the sample by a hemispherical mirror disposed oppositely on one side or both sides of a flat measurement sample and/or by multi-reflecting heat radiation from the back side of the sample to increase apparent emissivity of the back side of the sample. This technique is a method not requiring the blackening treatment on the surface of a test piece with a blackening agent, but it cannot be applied to a commercially available apparatus and there is room for improvement in practicality.

Non Patent Literature 1 discloses the results of investigating the influence on the individual difference in blackening treatment and the measurement accuracy by the thickness of a blackening treatment film using a commercially available general-purpose graphite spray as a research intending to evaluate the influence of blackening agent and clarify measurement accuracy, focusing on the blackening treatment which is a major factor affecting the result of thermal diffusivity measurement.

A blackening treatment method other than spray coating (Patent Literature 1) and a method requiring no blackening treatment (Patent Literature 2) have been proposed, but neither method is a simple method. Although the aforementioned method of blackening both sides of a sample by spray application using a commercially available aerosol-type graphite mold release agent or lubricant is simple, it is difficult to instantaneously form a thin and uniform coating film on the surface of a sample. Further, in order to measure the thermal conductivity of a sample having high thermal conductivity such as copper and a thin sample having a thickness of about several mm, a new type blackening agent is required.

Graphene is a nanocarbon material expected as a next-generation material, and has characteristics different from those of conventional carbon particles such as graphite microparticles and carbon black, so that the application development of graphene in industry has advanced, and many applied techniques for graphene have been proposed. In particular, the application of graphene to flexible displays by making use of its transparency and conductivity has attracted a considerable attention. As techniques relating to a multilayered graphene dispersion, the techniques of Patent Literatures 3 to 6 and the like are proposed. Patent Literature 3 proposes a multilayered graphene dispersion containing a multilayered graphene, a polymer having a hydrocarbon group of 12 to 30 carbon atoms and a nonionic group, and a ketone-based organic solvent. Patent Literature 4 proposes a technique of coating a substrate with a first graphene solution obtained by modifying graphene in an organic solvent with electron acceptor organic molecules constituting a charge transfer complex and a second graphene solution obtained by modifying graphene in an organic solvent with electron donor organic molecules constituting a charge transfer complex. Patent Literature 5 proposes a method of preparing a graphene solution using an alkali metal salt. Patent Literature 6 proposes a method of preparing a graphene sheet organic dispersion which is an aqueous dispersion.

However, in these conventional techniques, no examination has been made on the use of graphene as a blackening agent or the use of graphene as a blackening agent in the measurement of a thermal diffusion coefficient by a flash method.

Further, although commercially available aerosol-type graphite-based mold release agent or lubricant is widely used for preparation of a coating film for releasing and lubrication on the surface of a mold in powder sintering, aerosol type mold release agent/lubricant capable of forming a coating film more thinly and uniformly in a short time to improve production efficiency and improve the dimensional accuracy of a sintered body are required. Patent Literature 8 proposes an aqueous lubricant composition in which graphene-based nanocarbon is dispersed in water. Patent Literature 9 proposes a lubricant composition in which graphene-based nanocarbon is dispersed in a lubricant. Although it is proposed in these conventional techniques that the graphene-based nanocarbon-containing dispersion is used as a liquid lubricant for the purpose of reducing the abrasion of various mechanic components for a cutting work and the like, the use of the dispersion as a mold release agent/lubricant for forming a release/lubricating coating film on the surface of a mold for powder sintering is not examined. Since the conventional graphene-based nanocarbon-containing dispersion cannot be instantaneously formed into a thin and uniform coating film on the surface of a mold, it is not suitable for use as a mold release agent/lubricant for powder sintering, particularly as a mold release agent/lubricant for spark plasma sintering.

CITATION LIST

Patent Literature

Patent Literature 1: JP 2007-327851 A
Patent Literature 2: JP 10-123075 A
Patent Literature 3: JP 2015-199623 A
Patent Literature 4: JP 2011-63492 A
Patent Literature 5: JP 2013-510787 A
Patent Literature 6: JP 2015-59079 A
Patent Literature 7: JP 2013-212948 A
Patent Literature 8: JP 2016-098279 A
Patent Literature 9: JP 2016-069482 A Non Patent Literature Non Patent Literature 1: "Influence of Blackening Treatment on Thermal diffusivity measurement", Tokyo Metropolitan Industrial Technology Research Center Research Report, No. 10, 2015
Non Patent Literature 2: J. H. Lee et al.: "Graphene in Edge-Carboxylated Graphite by Ball Milling and Analyses Using Finite Element Method" International Journal of Materials Science and Applications 2013; 2(6): 209-220

SUMMARY OF INVENTION

Technical Problem

The present invention has been made in view of circumstances as described above, an object of the present invention is to provide a multilayered graphene dispersion capable of instantaneously forming a thin and uniform coating film containing multilayered graphene on the surface of a sample.

Another object of the present invention is to provide a blackening agent for thermophysical property measurement, which can instantaneously form a thin and uniform coating film containing multilayered graphene on the surface of a sample and is excellent in a blackening effect.

Another object of the present invention is to provide a mold release agent and/or lubricant for powder sintering, which can instantaneously form a thin and uniform coating film containing multilayered graphene on the surface of a mold and has excellent releasing and lubricating effects.

Further, the present invention provides, in addition to the above, a multilayered graphene dispersion excellent in dispersion stability and redispersibility, a blackening agent for thermophysical property measurement, and a mold release agent and/or lubricant for powder sintering as another object.

Solution to Problem

To solve the object described above, a multilayered graphene dispersion of the present invention is characterized in that multilayered graphene is dispersed in a liquid phase containing an organic solvent and a liquefied gas. In the multilayered graphene dispersion, the multilayered graphene preferably has a carbon purity of 90 mass % or more and a thickness of 1 nm to 10 nm. In the multilayered graphene dispersion, the multilayered graphene preferably has an average particle diameter of 1 μm to 10 μm. In the multilayered graphene dispersion, the organic solvent preferably contains a quick-drying solvent. The multilayered graphene dispersion preferably includes an organic polymer which is a dispersant of the multilayered graphene. In the multilayered graphene dispersion, the multilayered graphene preferably contains graphene oxide.

A blackening agent for thermophysical property measurement of the present invention is used for forming a blackened film on a surface of a sample for thermophysical property measurement, and the blackening agent includes the multilayered graphene dispersion. The blackening agent for thermophysical property measurement is preferably used by spraying by pressure of a gas phase containing vapor of the liquefied gas.

A mold release agent/lubricant for powder sintering of the present invention is used for forming a separation layer between a sintering mold and a sintered body in powder sintering, the mold release agent/lubricant including the multilayered graphene dispersion. The mold release agent/lubricant for powder sintering is preferably used by spraying by pressure of a gas phase containing vapor of the liquefied gas.

A multilayered graphene dispersion enclosure of the present invention includes: a sealed container in which the multilayered graphene dispersion according to any one of claims 1 to 6 is contained while the liquefied gas maintains vapor pressure equilibrium in a liquid phase and a gas phase; a valve body provided in the sealed container; and means for spraying the multilayered graphene dispersion from the sealed container by pressure of the gas phase by opening the valve body. The multilayered graphene dispersion enclosure is preferably used for forming a blackened film on a surface of a sample for thermophysical property measurement. Further, the multilayered graphene dispersion enclosure is preferably used for forming a separation layer between a sintering mold and a sintered body in powder sintering (for example, spark plasma sintering).

Advantageous Effects of Invention

According to the multilayered graphene dispersion of the present invention, a thin and uniform coating film containing multilayered graphene can be instantaneously formed on the solid surface.

Further, according to the blackening agent for thermophysical property measurement of the present invention, a thin and uniform coating film containing multilayered graphene can be instantaneously formed on the surface of a sample, and a blackening effect is excellent. It is possible to accurately measure the thermal conductivity of a sample having high thermal conductivity such as copper or a thin metal sample having a thickness of about several mm or less by the blackening treatment with the coating film containing multilayered graphene formed with the blackening agent for thermophysical property measurement according to the present invention.

Further, according to the mold release agent/lubricant for powder sintering of the present invention, a thin and uniform coating film containing multilayered graphene can be instantaneously formed on the surface of a sintering mold used in powder sintering (for example, a graphite type (isotropic graphite) sintering mold used in spark plasma sintering), and is excellent in releasing and lubricating effects. When forming a thin and uniform coating film containing multilayered graphene on the contact surface between the sintering mold and the powder sintered body, it is possible to more smoothly extrude the sintered body from the sintering mold and to increase the use life of an expensive sintering mold by reducing the wear of the sintering mold.

Further, according to the multilayered graphene dispersion, the blackening agent for thermophysical property measurement and the mold release agent/lubricant for powder sintering of the present invention, the dispersion stability and redispersibility become excellent by adjusting the average particle diameter of the multilayered graphene.

DESCRIPTION OF EMBODIMENTS

Figure 1:
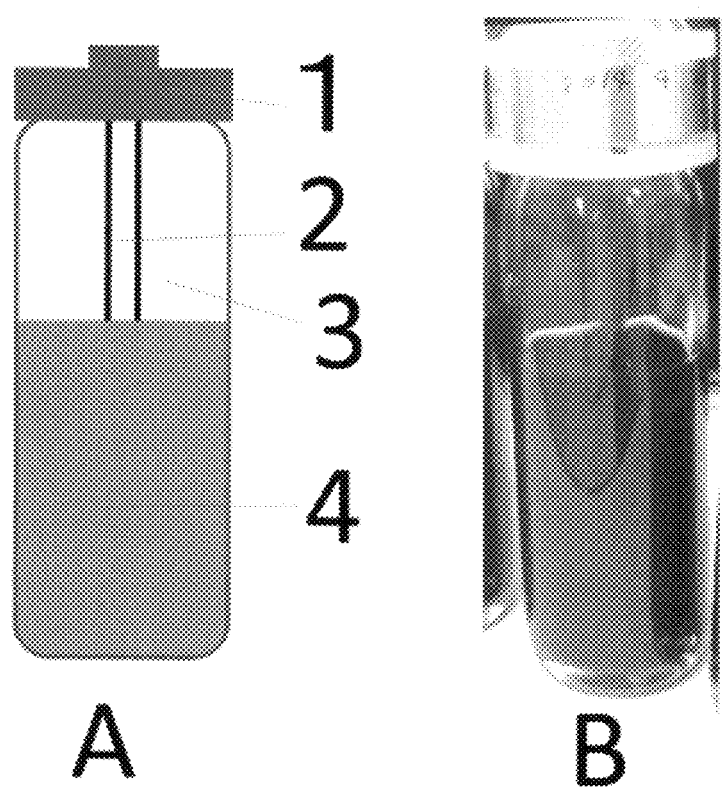
FIG. 1 is a view for explaining a schematic configuration of Example 1. A is a conceptual view showing the basic structure of Example 1, and B is a photograph of the actual product prepared in Example 1.

Hereinafter, the present invention will be described in detail.

The multilayered graphene dispersion of the present invention is characterized in that multilayered graphene is dispersed in a liquid phase containing an organic solvent and a liquefied gas. One of the characteristics of the present invention is that a multilayered graphene, an organic solvent, and a liquefied gas coexist in a hermetically sealed container, a liquid phase containing this multilayered graphene dispersion and a gas phase containing vapor of liquefied gas are hermetically contained in the sealed container, and the multilayered graphene dispersion is injected (spray-applied) from the sealed container by the pressure of gas phase, thereby instantaneously forming a multilayered graphene coating film.

Multilayered graphene used in the multilayered graphene dispersion will be described. In the present specification, the meanings of "graphene", "multilayered graphene", "graphene oxide", and "graphite" are interpreted based on common technical knowledge, but the following contents are particularly intended.

Graphene is a sheet in which carbon atoms form a hexagonal network in the form of honeycomb. Graphene has unique mechanical, thermal, electronic, optical properties, and is thus expected to be utilized in various industrial fields, such as flexible displays, transistors, optical sensors, RFIDs, solar cells, secondary batteries, fuel cells, super capacitors, and conductive inks.

Multilayered graphene is a flaky material having a thickness of 1 nm to 10 nm in which graphenes are laminated to form a plurality of layers.

Graphene oxide is a flaky material of one to several carbon atom layers obtained by the oxidation reaction of graphite in which oxygen-containing functional groups are attached to graphene.

Graphite is a flaky material having a thickness of more than 10 nm in which graphenes are laminated to form a plurality of layers. Graphite is largely classified into natural graphite and artificial graphite.

The method for preparing the multilayered graphene used in the present invention is not particularly limited, and a commercially available multilayered graphene powder may be used. It is preferable that the multilayered graphene used in the present invention has a carbon purity of 90 mass % or more. The multilayered graphene may contain single layered graphene and carbon particles such as, graphene oxide particles, carbon black particles, or graphite microparticles. When the purity of carbon in the multilayered graphene is less than 90% by mass fraction, inconvenience such as deterioration of dispersion stability and remarkably lowered blackening effect may occur.

Among various multilayered graphenes, multilayered graphene powder mass-produced by a method of stripping natural graphite is preferably used in the present invention because it is inexpensive and easily available. Most of the commercially available multilayered graphene has a thickness of 1 nm to 10 nm and a surface size of 1 μm to 20 μm. Examples of commercially available multilayered graphene include "Graphene powder" manufactured and sold by Graphene Platform Co., Ltd. (Tokyo), "Graphene Nanoplatelets" manufactured and sold by XG Sciences, Inc. (Michigan, U.S.A), and "Graphene Oxide (edge-oxidized)" manufactured and sold by Garmor Inc. (Florida, U.S.A.). Although they have different product names, they belong to the range of multilayered graphene in this specification.

In addition, graphene having a functional group attached to its end, that is, partially oxidized graphene can be used. The method of producing the partially oxidized graphene is not particularly limited. For example, the partially oxidized graphene can be produced by a known technique (Non Patent Literature 2).

In addition to the partially oxidized graphene, graphene oxide which is interpreted based on common technical knowledge can be used. Graphene oxide has various synthesis methods, and its performance and application depend on the oxidation degree thereof. Graphene oxide generally has a structure having a hydroxyl group, an epoxy group, and a carboxyl group in a graphene sheet, and exhibits dispersibility in a polar solvent. In addition, graphene oxide exhibits different properties from graphene. The method of producing the graphene oxide is not particularly limited. For example, the graphene oxide can be produced by a known technique (Non Patent Literature 7).

The multilayered graphene used in the present invention has a thickness of 1 nm to 10 nm, preferably 2 nm to 8 nm, and more preferably 3 nm to 7 nm. When the multilayered graphene is too thin, its properties becomes close to the properties of single layered graphene, and transparency increases, so a blackening effect decreases. When the multilayered graphene is too thick, its properties becomes close to the properties of graphite, and dispersion stability becomes worse.

The multilayered graphene used in the present invention has an average particle diameter of 1 μm to 10 μm, and preferably 2 μm to 6 μm. Here, the average particle diameter of multilayered graphene particles can be obtained as a median diameter which is a particle diameter at which the cumulative value of frequency from the lower limit or upper limit in the particle diameter distribution curve measured using a laser diffraction/scattering type particle size distribution measuring apparatus reaches 50%. When the particle diameter of the multilayered graphene is too large, the dispersion stability of the multilayered graphene dispersion tends to be poor. When the particle diameter of the multilayered graphene is too small, on the contrary, aggregation tends to occur easily.

It is desirable that the particle diameter of the multilayered graphene used in the present invention is set to be within the above range by adjusting the two-dimensional size of commercially available multilayered graphene particles to an appropriate size by grinding processing or by selecting multilayered graphene powder having an appropriate size from among various commercially available multilayered graphene powders. The method of grinding multilayered graphene powder to an appropriate size is not particularly limited, and any known fine grinding technique and apparatus can be applied. For example, medium stirring type mills such as ball mills, planetary ball mills, bead mills, and the like, which are usually commercially available, or jet mills can be applied. In this case, it is desirable to adjust the particle size to a desired particle size range and, at the same time, to set appropriate conditions so as not to excessively crush or to destroy the crystal structure of graphene so as not to turn amorphous. For example, appropriate grinding conditions can be determined based on the particle size distribution measurement by a laser diffraction/scattering method and the crystal structure analysis by powder X-ray diffraction method.

The mass fraction of the multilayered graphene in the multilayered graphene dispersion of the present invention is preferably from 0.20% to 2.00%, and more preferably from 0.5% to 1.50%. When the mass fraction of the multilayered graphene is too small, a blackening effect decreases. When the mass fraction of the multilayered graphene is too large, the graphene coating film easily becomes nonuniform.

Next, a preferable preparation procedure of the multilayered graphene dispersion of the present invention will be described. The meanings of dispersion stability and redispersibility in the present specification including the following explanation are as follows. Dispersion stability means that the multilayered graphene particles are stabilized without causing sedimentation or aggregation in a state where the multilayered graphene particles, an organic solvent, and liquefied gas coexist.

Redispersibility means that, in a state where the multilayered graphene particles, an organic solvent, and liquefied gas coexist, the sedimentation of the multilayered graphene particles can be observed, but the multilayered graphene particles can be easily returned to the previous dispersion state by shaking a container.

First, a stock solution I is prepared by dispersing multilayered graphene powder in an organic solvent.

The organic solvent used for preparing the stock solution I is not particularly limited as long as it stably disperses the multilayered graphene particles. Specifically, examples of the organic solvent include monohydric alcohols and polyhydric alcohols of 1 to 4 carbon atoms such as methanol, ethanol, 2-propanol, 1-butanol, and 1-methoxy-2-propanol, derivatives of polyhydric alcohols, ketones, esters, ethers, carbonates. If necessary, combinations of two or more kinds thereof can be used.

From the viewpoint of high safety and availability, it is preferable to use an alcohol solvent mainly composed of alcohol. Since 2-propanol has a hydrogen bonding property by a hydroxyl group, it is compatible with a polar solvent such as an alcohol, and it has a relatively large hydrophobic group (isopropyl group), so it exhibits amphiphilicity compatible with a nonpolar solvent such as ether, which is thus preferable. Further, since it is possible to improve the dispersion stability of the multilayered graphene particles, a mixed solvent of plural kinds of alcohols based on 2-propanol is preferably used.

It is preferable that the multilayered graphene dispersion of the present invention contain an organic polymer as a dispersant of multilayered graphene. Dispersion stability can be improved by blending an organic polymer as a dispersant. The organic polymer of a dispersant is not particularly limited as long as it is dissolved in the organic solvent used for preparing the stock solution I. Examples of the organic polymer include cellulose derivatives such as ethyl cellulose, hydroxyethyl cellulose, hydroxypropyl cellulose, carboxymethyl cellulose sodium, a (meth)acrylic copolymer, an N-vinyl-2-pyrrolidone copolymer, and polyvinylpyrrolidone.

Among these, ethyl cellulose is preferred from the viewpoint of an excellent dispersion effect. Ethyl cellulose is soluble in alcohol and many other organic solvents and has an effect of adsorbing on the surface of multilayered graphene particles and suppressing aggregation between multilayered graphene particles. Ethyl cellulose plays an important role in suppressing the aggregation of multilayered graphene particles and forming a uniform coating film on the surface of a sample when the organic solvent is evaporated. The mass fraction of ethyl cellulose in the multilayered graphene dispersion of the present invention is preferably 0.10% to 1.00%, and more preferably 0.3% to 1.00%. When the mass fraction of ethyl cellulose is too small, the dispersion stability of the multilayered graphene deteriorates. When the mass fraction of ethyl cellulose is too large, redispersibility deteriorates.

In the preparation of stock solution I, the method of dispersing the multilayered graphene in the organic solvent is not particularly limited. For example, an ultrasonic homogenizer, a ball mill, a bead mill, a stirrer, or the like can be used. An ultrasonic homogenizer is preferably used because it is easy to operate.

Next, a stock solution II is prepared by blending the stock solution I and a quick-drying solvent.

A coating film containing multilayered graphene can be prepared thinly, uniformly, and instantaneously by blending a quick-drying solvent as a part of the organic solvent. Here, as the quick-drying solvent, for example, an organic solvent having a boiling point of 30 to 80° C. under atmospheric pressure can be used. The quick-drying solvent is not particularly limited as long as it has good compatibility with an organic solvent for dispersing multi-layered graphene particles, and examples thereof dichloromethane, cyclopentane, and a thinner, which have good compatability with an alcohol-based solvent. Among these, cyclopentane, which is relatively less harmful, is preferable.

When an alcohol-based solvent is used in the stock solution I, the mass ratio of alcohol-based solvent and quick-drying solvent (alcohol-based solvent: quick-drying solvent) in the stock solution II is preferably 20:80 to 40:60. When the blending ratio of the alcohol-based solvent is too small, the dispersion stability of the multilayered graphene particles deteriorates. When the blending ratio of the alcohol-based solvent is too large, quick-drying properties deteriorate.

Next, the stock solution II is charged in a sealed container. Then, a liquefied gas is injected into the sealed container, thereby preparing the multilayered graphene dispersion of the present invention.

The liquefied gas used in the present invention is not particularly limited as long as it has high critical temperature and can be easily liquefied by pressurization around normal temperature. For example, liquefied petroleum gas (LPG) and dimethyl ether (DME) can be used. Dimethyl ether is preferable because of its relatively high safety. When these liquefied gases are injected into the atmosphere, they become gaseous phase gas whose volume is, for example, 200300 times. This rapid expansion finely disperses the multilayered graphene particles. Therefore, the multilayered graphene particles can be blown uniformly on the surface of a test piece, so that blackening treatment can be uniformly performed.

In order to perform appropriate blackening treatment by spray application as a blackening agent for measuring thermophysical properties and in order to perform appropriate releasing/lubrication treatment by spray application as a mold release agent/lubricant for powder sintering, the blending mass fraction of DME in the liquid phase in which the multilayered graphene is dispersed is preferably 60% to 90%, more preferably 70% to 80%, and still more preferably 73% to 75%. When the blending amount of DME is too small, a coating film containing the multilayered graphene easily becomes nonuniform. Further, when the blending amount of DME is too large, a coating film containing the multilayered graphene easily becomes nonuniform as well.

The multilayered graphene dispersion of the present invention can be used in the same manner as a conventional aerosol product. That is, the multilayered graphene dispersion of the present invention can be used as the following multilayered graphene dispersion enclosure. This multilayered graphene dispersion enclosure includes a sealed container in which a liquefied gas is charged while maintaining vapor pressure equilibrium in a liquid phase and a gas phase, a valve body provided in the sealed container, and means for injecting the multilayered graphene dispersion from the sealed container by the pressure applied in the gas phase by opening the valve body. This multilayered graphene dispersion enclosure can be suitably used for forming a blackened film on the surface of a sample for thermophysical property measurement. Further, this multilayered graphene dispersion enclosure can be suitably used for forming a separation layer between a sintering mold and a sintered body in powder sintering, and particularly, can be more suitably used for forming a separation layer between a graphite (isotropic graphite) mold and a sintered body in spark plasma sintering.

The sealed container is not particularly limited as long as it can hermetically contain the multilayered graphene dispersion. For example, it is possible to use a sealed container including a valve body-equipped lid and a pressure-resistant container body forming an enclosed space therein by attaching the valve body-equipped lid. As the pressure-resistant container body, for example, a glass container or the like can be used. As the sealed container, for example, a sealed container having an internal volume of 200 ml to 1500 ml can be used.

The valve body is not particularly limited as long as it has a valve mechanism capable of hermetically containing the multilayered graphene dispersion upon closure. Various types of valve bodies can be used.

The means for injecting the multilayered graphene dispersion from the sealed container by the pressure of the gas phase by opening the valve body is not particularly limited. For example, there is exemplified means including a mechanism opening a valve body such as an injection button and a tube body such as a dip tube in which a lower end is immersed in a liquid phase in the pressure-resistant container and an upper end is communicated with the valve body.

FIG. 1A shows an example of a multilayered graphene dispersion enclosure. In FIG. 1A, reference numeral 1 is a transparent pressure-resistant glass container mounted with a valve body-equipped lid, reference numeral 2 is a dip tube, reference numeral 3 is a gaseous phase (dimethyl ether), and reference numeral 4 is a liquid phase containing multilayered graphene particles, ethyl cellulose (dispersant), 2-propanol (organic solvent), cyclopentane (quick-drying solvent among organic solvents) and dimethyl ether (liquefied gas). Since the transparent pressure-resistant glass container 1 is mounted with the valve body-equipped lid and the dip tube 2, the multilayered graphene dispersion can be discharged and injected by pressing the lid.

The present invention can be used in the same manner as conventional aerosol products. That is, a coating film containing multilayered graphene can be formed by a method where a liquid phase II in which multilayered graphene is dispersed and a liquefied gas are injected into a container having a valve body of 200 ml to 1500 ml, and then the valve body is opened by pushing an injection button, thereby discharging the liquid phase by the vapor pressure of the liquefied gas, that is, it is possible to carry out blackening treatment and releasing/lubrication treatment of the surface of a mold for powder sintering.

According to the above-described multilayered graphene dispersion of the present invention described above, a thin and uniform coating film containing multilayered graphene on the solid surface can be instantaneously formed, and dispersion stability and redispersibility become excellent by adjusting the average particle diameter of the multilayered graphene. From this viewpoint, the multilayered graphene dispersion of the present invention can be used for a blackening agent for thermophysical property measurement, and can expect applications to antistatic performance, heat absorption and the like, and the effects of lubricant and mold release agent.

The blackening agent for measuring thermophysical property of the present invention is a blackening agent for forming a blackened film on the surface of a sample for thermophysical property measurement and is composed of the multilayered graphene dispersion of the present invention. Preferably, the blackening agent for measuring thermophysical property of the present invention is injected by the pressure of a gas phase containing vapor of liquefied gas contained in the multilayered graphene dispersion, and is then used.

According to the blackening agent for thermophysical property measurement, a thin and uniform coating film containing multilayered graphene on the surface of the sample can be instantaneously formed, and a blackening effect is excellent. Further, dispersion stability and redispersibility become excellent by adjusting the average particle diameter of the multilayered graphene. The blackening agent for thermophysical property measurement of the present invention can be used, for example, for blackening both surfaces of a sample in a flash method capable of measuring thermal conductivity in a short time. It is possible to accurately measure the thermal conductivity of a sample having high thermal conductivity such as copper or a thin metal sample having a thickness of about several mm or less by the blackening treatment with the coating film containing the multilayered graphene prepared with the blackening agent for thermophysical property measurement of the present invention.

The mold release agent/lubricant for powder sintering of the present invention is a mold release agent/lubricant for forming a separation layer between a sintering mold and a sintered body in powder sintering, and is composed of the multilayered graphene dispersion of the present invention. Preferably, the mold release agent/lubricant for powder sintering of the present invention is used by spraying by the pressure of a gas phase containing vapor of liquefied gas contained in the multilayered graphene dispersion.

According to the mold release agent/lubricant for powder sintering of the present invention, a thin and uniform coating film containing the multilayered graphene can be instantaneously formed on the surface of a mold for powder sintering, and releasing and lubrication effects are excellent. Further, dispersion stability and redispersibility become excellent by adjusting the average particle diameter of the multilayered graphene. The mold release agent/lubricant for powder sintering of the present invention can be used for forming a thin and uniform coating film, that is, a separation layer containing the multilayered graphene on the contact surface with a graphite (isotropic graphite) type mold used in spark plasma sintering. It is possible to more smoothly extrude a sintered body from the sintering mold and increase the use life of the sintering mold by reducing the wear of an expensive sintering mold by the surface treatment of a mold for powder sintering by the coating film containing the multilayered graphene prepared with the mold release agent/lubricant for powder sintering of the present invention.

EXAMPLES

Hereinafter, the present invention will be described in more detail with reference to examples, but the present invention is not limited to these examples.

Figure 8:
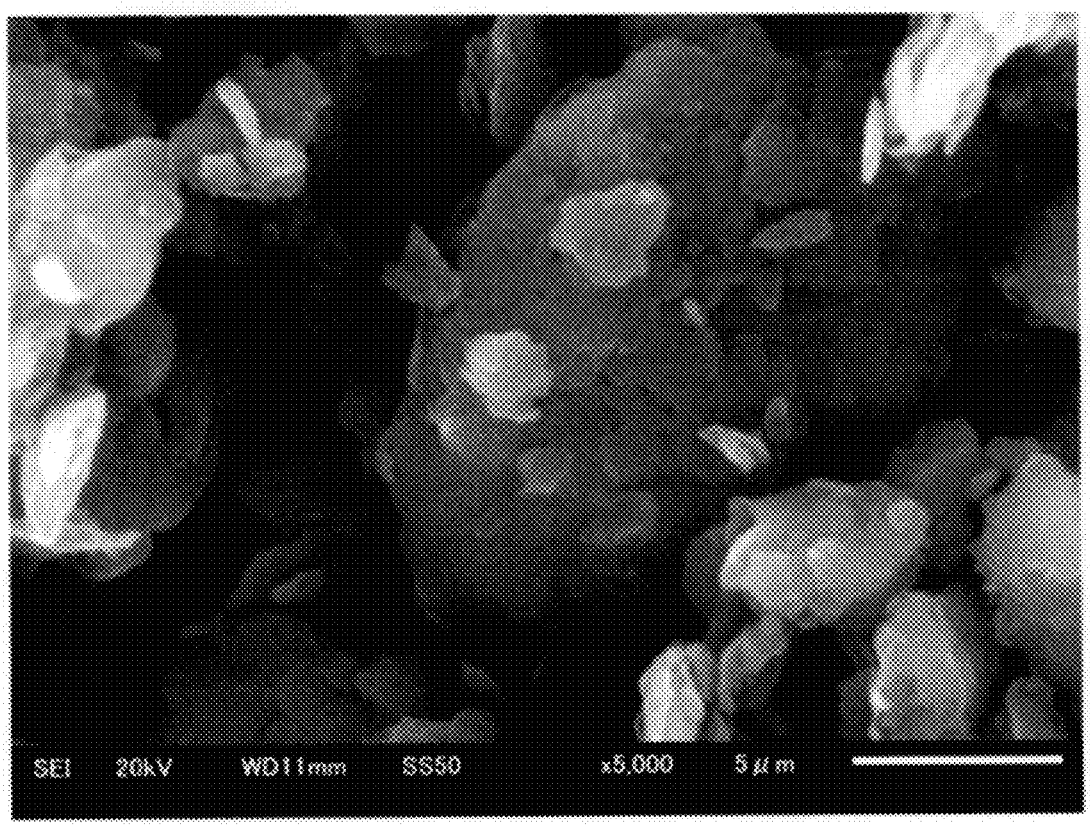
FIG. 8 is a scanning electron micrograph of multilayered graphene particles used in Example 1.
Figure 9:
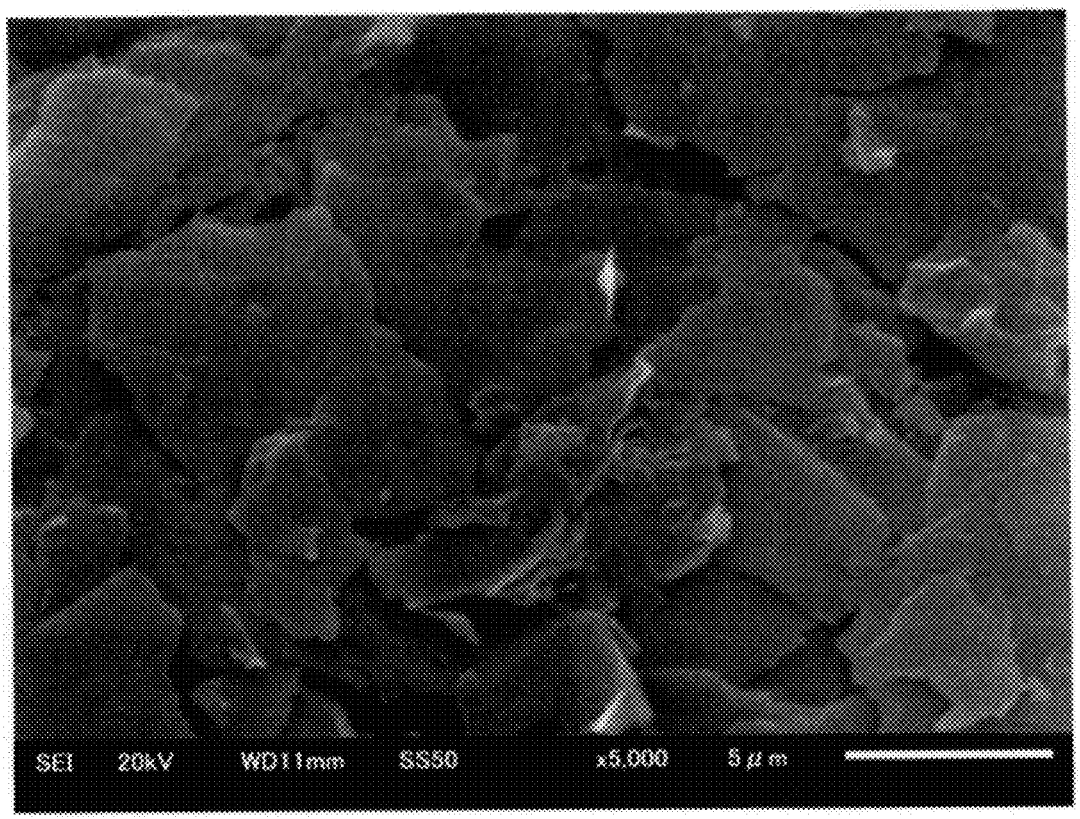
FIG. 9 is a scanning electron micrograph of multilayered graphene particles used in Example 4.
Figure 10:
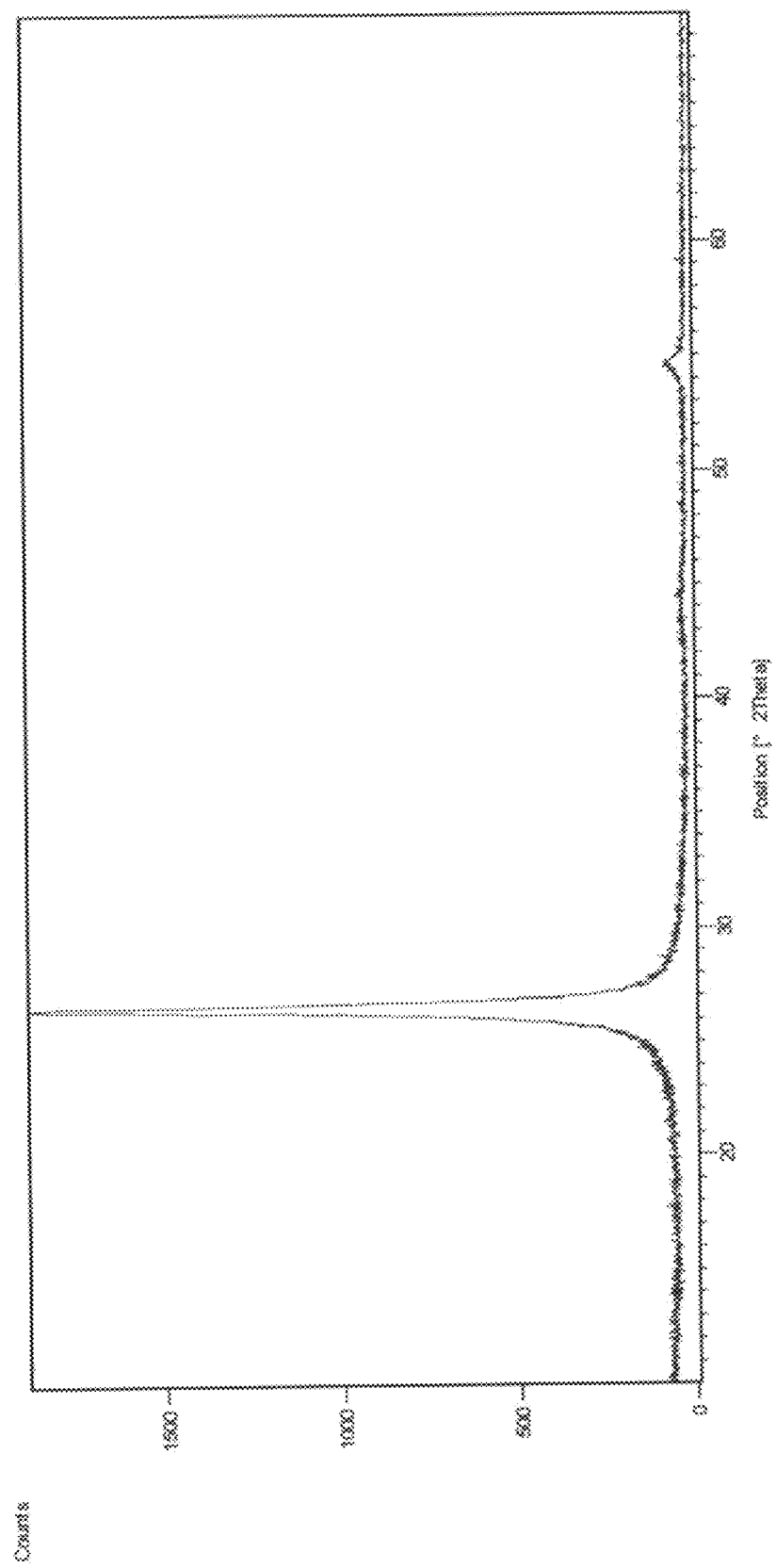
FIG. 10 is a view showing the measurement results of multilayered graphene of Example 1 using XRD.
Figure 11:
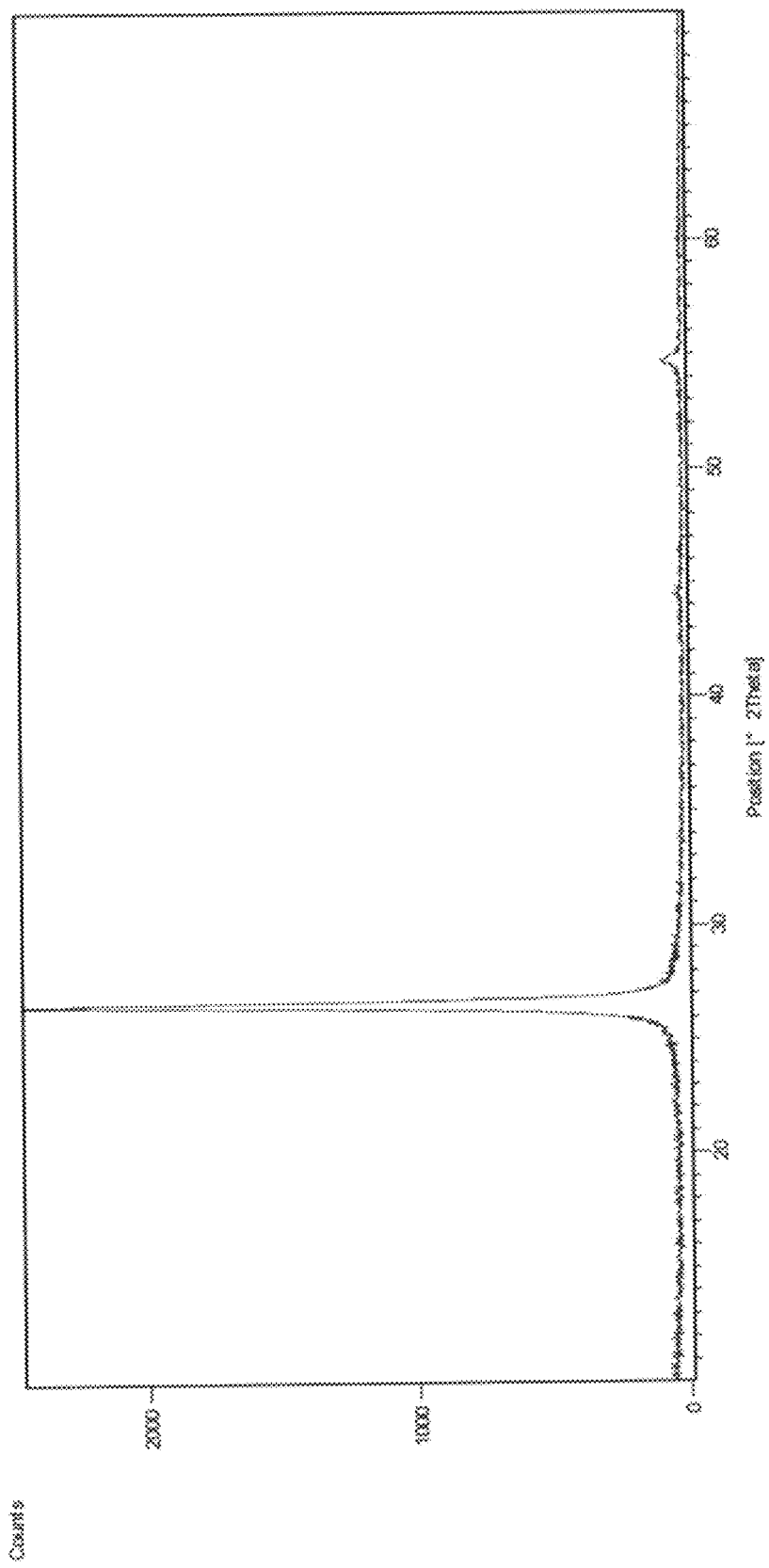
FIG. 11 is a view showing the measurement results of multilayered graphene of Example 4 using XRD.

1. Measurement Method
(1) Particle Diameter Measurement
Particle diameter measurement was carried out by laser diffraction/scattering type particle size distribution measurement method (FIGS. 2 to 6). The used apparatus is a particle size distribution measurement apparatus (LA-950V2 type) of HORIBA Ltd.
Measurement conditions are as follows.
Dispersion medium: 2-propanol
Pre-dispersion treatment: none
Measurement method: batch method using batch type cell unit
Solvent refractive index: 1.378
Sample refractive index: 1.920-0.000i
Particle diameter standard: volume
Repeat times: 15
(2) Crystal Structure Analysis
A milling powder X-ray diffractometer (XPERT-PRO MPD) manufactured by PANalytical Co. Ltd. was used (FIGS. 10 and 11). Specific measurement conditions are as follows.
Scanning range [°2θ]: 10.000 to 70.000
Target: Cu
X-ray output setting: 40 mA, 45 kV
Step size [°2θ]: 0.017
Scan step time/s: 3.8762
Scan type: continuous
Sample width/mm: 10.00
Measurement temperature/° C.: 25
(3) Morphological Observation
Scanning electron microscope (JSM-6610LA) manufactured by JEOL Ltd. was used (FIGS. 8 and 9). As pretreatment, a powder sample was fixed on a carbon tape, and then gold deposition was performed. The acceleration voltage at the time of measurement was 20 kV.
2. Preparation of Multilayered Graphene Dispersion Example 1

Figure 2:
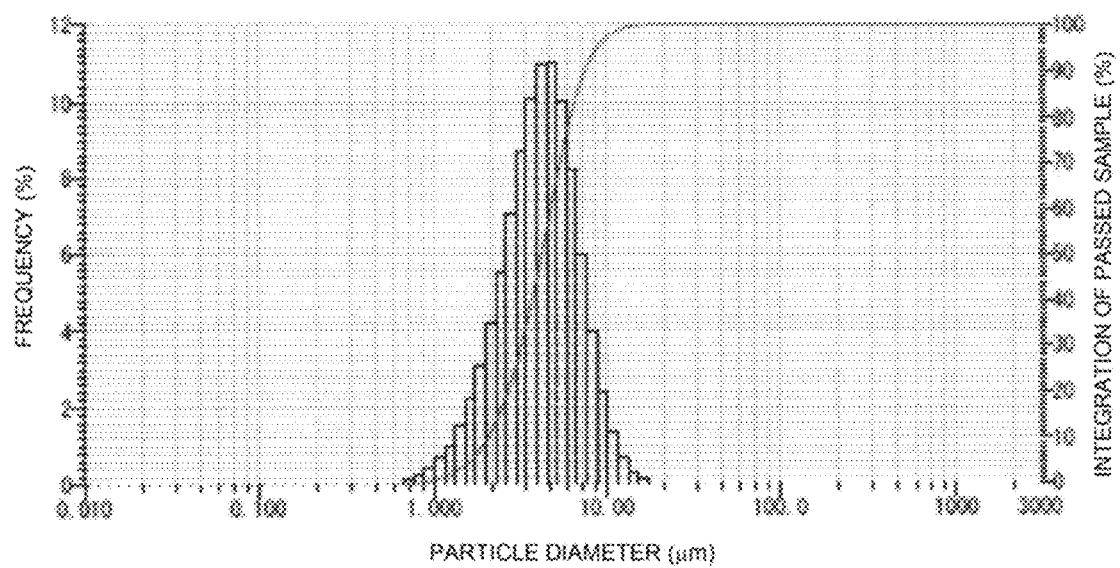
FIG. 2 is a view showing the measurement results of particle size distribution of multilayered graphene particles used in Example 1.

3 g of multilayered graphene powder (Graphene Nanoplatelets, Grade M, thickness 5 nm, manufactured by XG Sciences Inc. in U.S.A.) was put into a zirconia container having a volume of 45 ml together with 45 g of zirconia balls having a diameter of 5 mm, and pulverization treatment was carried out for 12 hours at a rotation speed of 800 rpm using a planetary ball mill (Model P-7, manufactured by Fritsch Japan Co., Ltd.), so as to obtain 12 g of multilayered graphene powder pulverized under the same conditions. As a result of measuring the particle diameter, the median diameter of the pulverized multilayered graphene powder was 4.2 μm (FIG. 2). As a result of analysis of the crystal structure of the pulverized multilayered graphene by powder X-ray diffractometry (XRD), it was confirmed that the crystal structure of the multilayered graphene was not destroyed by pulverization (FIG. 10). In addition, as a result of observation with a scanning electron microscope, it was found that the multilayered graphene particles which were pulverized for 12 hours had a flake shape, and the two dimensional size thereof was about several μm (FIG. 8).

5 g of a dispersant (ethyl cellulose, deer first grade, purity 10 cp, manufactured by Kanto Kagaku, product number 14076-01) was added to 100 ml of a mixed solvent having the composition shown in Table 1, the mixed solvent was impregnated with the dispersant over 2 weeks to completely dissolve the dispersant, and was stirred until it became a transparent liquid. Next, 10 g of the graphene powder having pulverized for 12 hours was added to the dispersant-containing mixed solvent, and the graphene powder was dispersed by ultrasonic irradiation for 15 minutes at an output of 80% using an ultrasonic homogenizer (VCX-750, manufactured by Sonics & Materials, USA), so as to prepare a stock solution I. Next, 4.5 g of the stock solution I was put into 100 ml of a beaker, and then 10.5 g of cyclopentane, as a quick-drying solvent, was added while stirring, so as to prepare stock solution II. Next, 12.5 g of the stock solution II was put into a transparent pressure-resistant glass container having an internal volume of 100 ml, and then 35.6 g of liquefied gas DME was injected into the pressure-resistant glass container to obtain multilayered graphene dispersion (FIGS. 1A and 1B). Since the transparent pressure-resistant glass container is mounted with a valve body-equipped lid and a dip tube, the multilayered graphene dispersion can be discharged by pushing the lid. In this multilayered graphene dispersion, a liquid phase in the container coexists with a gas phase containing liquefied gas DME which is one of the components of the liquid phase.

TABLE 1

Composition of mixed solvent used for preparation of stock solution I in each example

| Solvent | 2-propanol | 1-butanol | 1-methoxy-2-propanol |
|---|---|---|---|
| Mass fraction (%) | 90 | 5 | 5 |

Example 2

Figure 3:
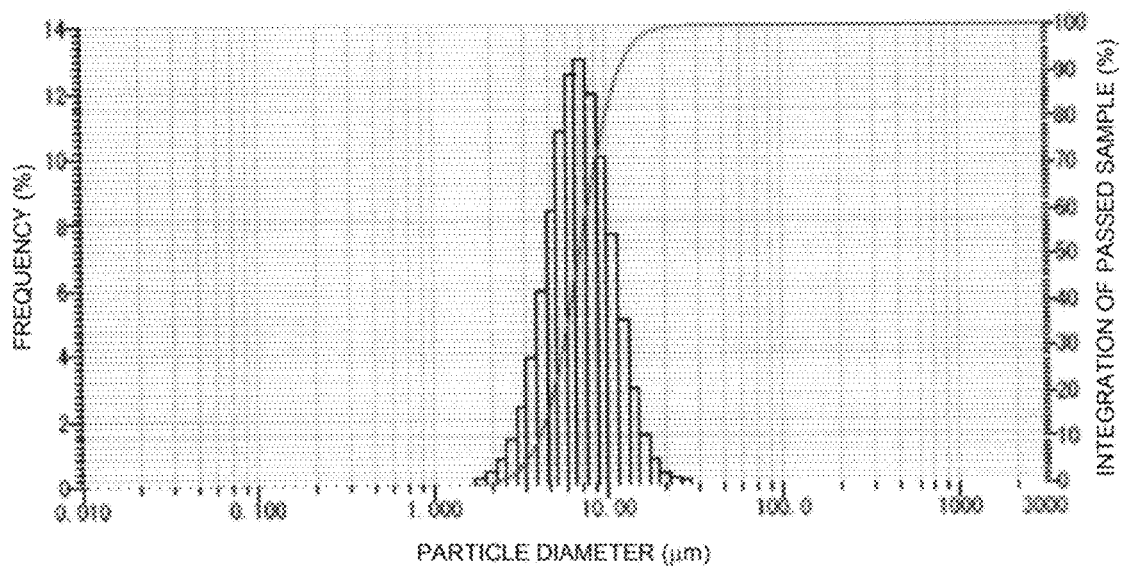
FIG. 3 is a view showing the measurement results of particle size distribution of multilayered graphene particles used in Example 2.

Multilayered graphene dispersion was prepared in the same manner as in Example 1, except that the time of pulverization treatment of the multilayered graphene powder of Example 1 was 6 hours. As a result of measuring the particle diameter, the median diameter of the multilayered graphene powder pulverized for 6 hours was 7.0 µm (FIG. 3)

Example 3

Figure 4:
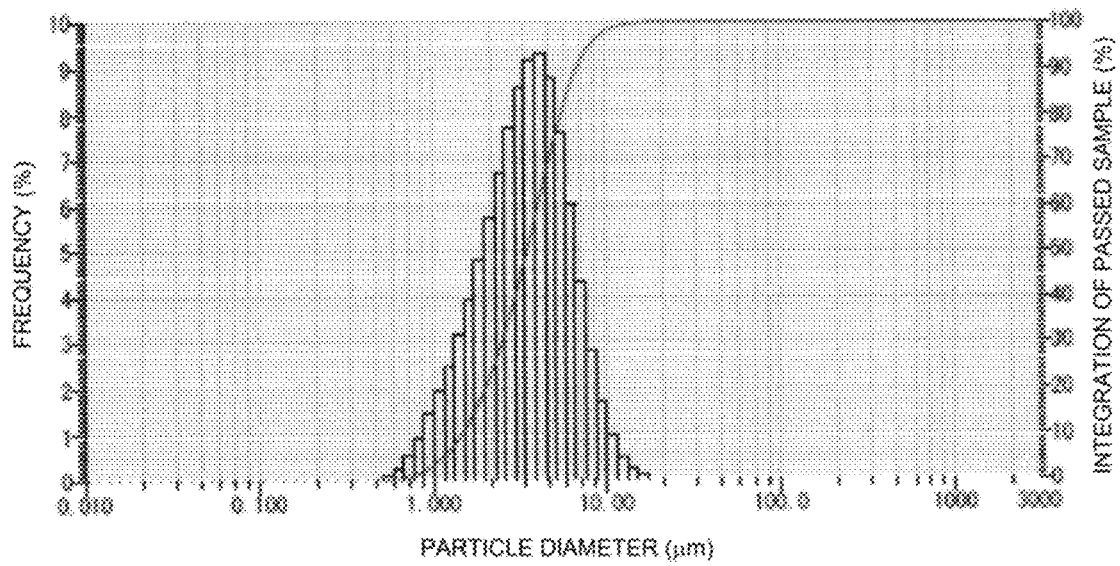
FIG. 4 is a view showing the measurement results of particle size distribution of multilayered graphene particles used in Example 3.

As the multilayered graphene powder, graphene oxide (edge-oxidized) (manufactured by Garmor Inc. (Florida, U.S.A)) was used. The dispersion treatment of the multilayered graphene powder was carried out under exactly the same conditions as in Example 1 without pulverization treatment, so as to prepare multilayered graphene dispersion. As a result of measuring the particle diameter of the multilayered graphene powder of this example, the median diameter thereof was 3.5 µm (FIG. 4).

Example 4

Figure 5:
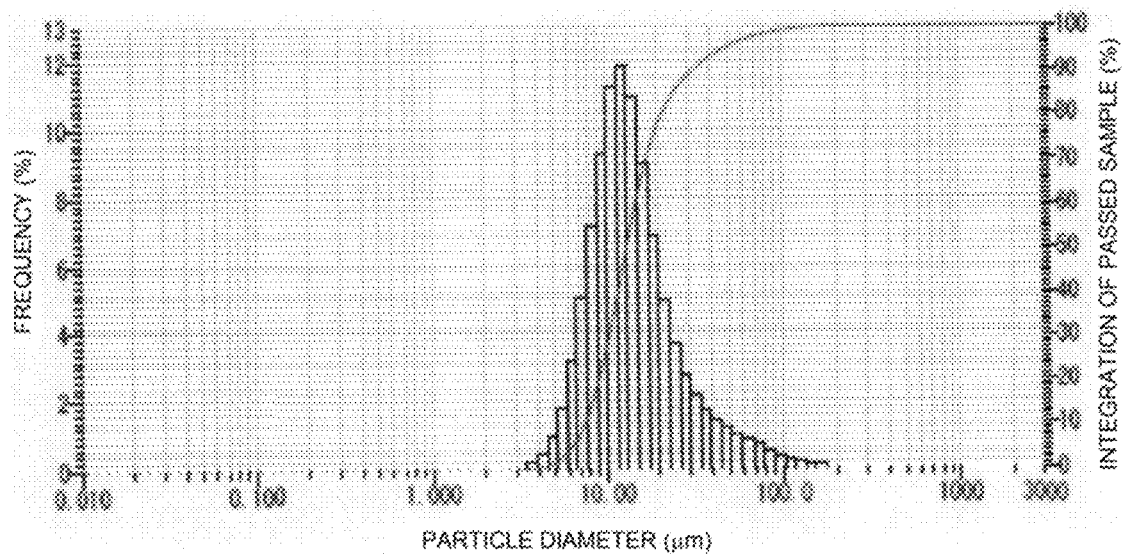
FIG. 5 is a view showing the measurement results of particle size distribution of multilayered graphene particles used in Example 4.

As the multilayered graphene powder, Graphene Nanoplatelets (Grade M, manufactured by XG sciences Inc. in U.S.A) were used. The dispersion treatment of the multilayered graphene powder was carried out under exactly the same conditions as in Example 1 without pulverization treatment, so as to prepare multilayered graphene dispersion. As a result of measuring the particle diameter of the multilayered graphene powder of this example, the median diameter thereof was 13.1 µm (FIG. 5). As a result of analysis by powder X-ray diffraction method (XRD), it was found that the multilayered graphene powder of this example had the same crystal structure as the multilayered graphene powder of Example 1 (FIG. 11). In addition, as a result of observation with a scanning electron microscope, it was found that the multilayered graphene particles of this example had a flake shape, and the two dimensional size thereof was larger than the two dimensional size of the pulverized multilayered graphene particles of Example 1 (FIG. 11).

Example 5

Figure 6:
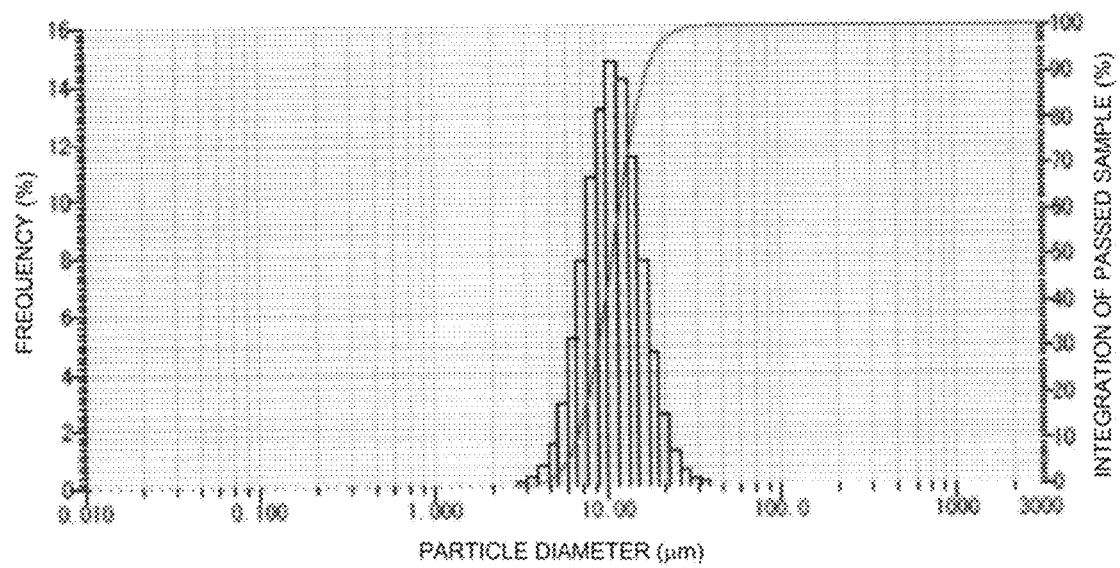
FIG. 6 is a view showing the measurement results of particle size distribution of multilayered graphene particles used in Example 5.

Multilayered graphene dispersion was prepared in the same manner as in Example 1, except that the time of pulverization treatment of the multilayered graphene powder of Example 1 was 3 hours. As a result of measuring the particle diameter, the median diameter of the multilayered graphene powder pulverized for 3 hours was 10.8 µm (FIG. 6)

Example 6

Multilayered graphene dispersion was prepared in the same manner as in Example 1, except that, in the dispersion treatment of the multilayered graphene powder of Example 1, 1 g of a dispersant (ethyl cellulose, deer first grade, purity 10 cp, manufactured by Kanto Kagaku, product number 14076-01) was added to 100 ml of the mixed solvent.

Example 7

Multilayered graphene dispersion was prepared in the same manner as in Example 1, except that, in the dispersion treatment of the multilayered graphene powder of Example 1, 10 g of a dispersant (ethyl cellulose, deer first grade, purity 10 cp, manufactured by Kanto Kagaku, product number 14076-01) was added to 100 ml of the mixed solvent.

3. Evaluation

[Evaluation of Dispersion Stability and Redispersibility]

Since existing devices and standards capable of evaluating the dispersion stability and redispersibility of fine particle dispersion containing liquefied gas do not exist, the evaluation of dispersion stability and redispersibility was performed by the following visual method, based on experience.

Evaluation of Dispersion Stability 12.5 g of stock solution II is charged in a transparent pressure-resistant glass container having a valve with a content of 100 ml, and then 35.6 g of liquefied gas is injected. Next, the container is vertically inverted by shaking with hand for 1 minute 30 times, and the stock solution II is sufficiently mixed and dispersed, and then statically left for 24 hours. The sedimentation of the multilayered graphene particles is visually confirmed. In evaluation criteria, a case where sedimentation of multilayered graphene particles and separation of a liquid layer do not occur at all is evaluated as A, a case where sedimentation of multilayered graphene particles and separation of a liquid layer somewhat occur is evaluated as B, and a case where sedimentation of multilayered graphene particles and separation of a liquid layer remarkably occur is evaluated as C.

Evaluation of Redispersibility

After evaluating the dispersion stability, the container is vertically inverted for 1 minute 30 times again, and the stock solution II is sufficiently mixed and dispersed, and then a part of the stock solution II was discharged such that about 30 ml of a liquid phase as contents remained. Next, the container is left for 1 month. Next, the container is vertically inverted by shaking with hand for 6 seconds 3 times, and then immediately the container is tilted at 45°, and the amount of nondispersed aggregate remaining in the bottom of the container is visually checked. In evaluation criteria, a case where nondispersed aggregate does not remain at all is evaluated as A, a case where nondispersed aggregate remains in a small amount is evaluated as B, and a case where nondispersed aggregate remains in a large amount is evaluated as C.

TABLE 2

Dispersion stability and redispersibility of multilayered graphene dispersion of each Example

| Multilayered graphene dispersion | Example 1 | Example 2 | Example 3 | Example 4 | Example 5 | Example 6 | Example 7 |
|---|---|---|---|---|---|---|---|
| Dispersion stability | A | A | A | C | B | B | A |
| Redispersibility | A | A | A | B | A | A | B |

[Evaluation of Thermal Stability]

From a sealed container filled with a liquid phase containing the multilayered graphene dispersion of Example 3 and a gas phase containing vapor of liquefied gas, the multilayered graphene dispersion was injected (spray-applied) on a sapphire substrate having a diameter of 6 mm by the pressure of the gas phase to form 0.340 mg of a multilayered graphene layer, and the multilayered graphene layer was set to a measurement container made of Pt—Rh. The thermal stability of this multilayered graphene layer was measured by thermogravimetry (TG) from room temperature to 1000° C. in an inert gas atmosphere using a thermal balance (TG 209 F1 Libra (registered trademark) (FIG. 12).

Figure 12:
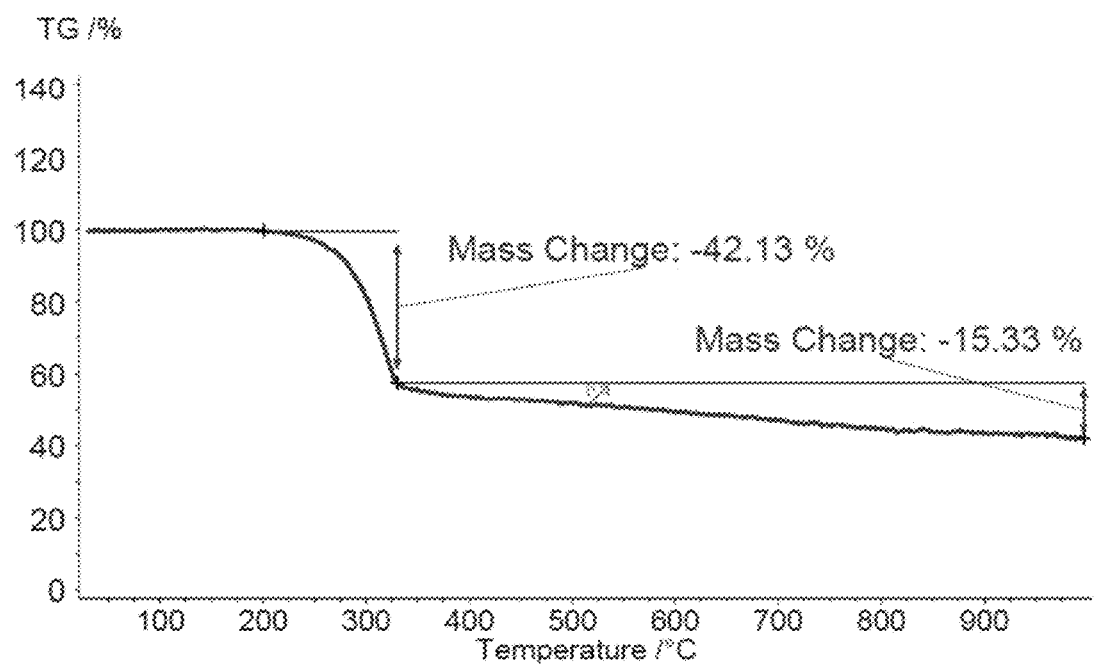
FIG. 12 is a view showing the results of thermogravimetry (TG) of a multilayered graphene layer prepared using the multilayered graphene dispersion of Example 3.

Regarding the measurement results shown in FIG. 12, it was estimated that the weight loss of −42.13% seen between about 200° C. and 330° C. is a weight loss derived from ethyl cellulose (dispersant) contained in the multilayered graphene dispersion, and it was estimated that the weight loss of −15.33% seen between 330° C. and 1000° C. corresponds to a weight loss of multilayered graphene. Further, since the multilayered graphene remained in the measurement container after the measurement, it was found that the multilayered graphene dispersion according to the present invention can be applied to a flash method relatively stably even in high temperature measurement.

[Application to Blackening Agent]

Figure 7:
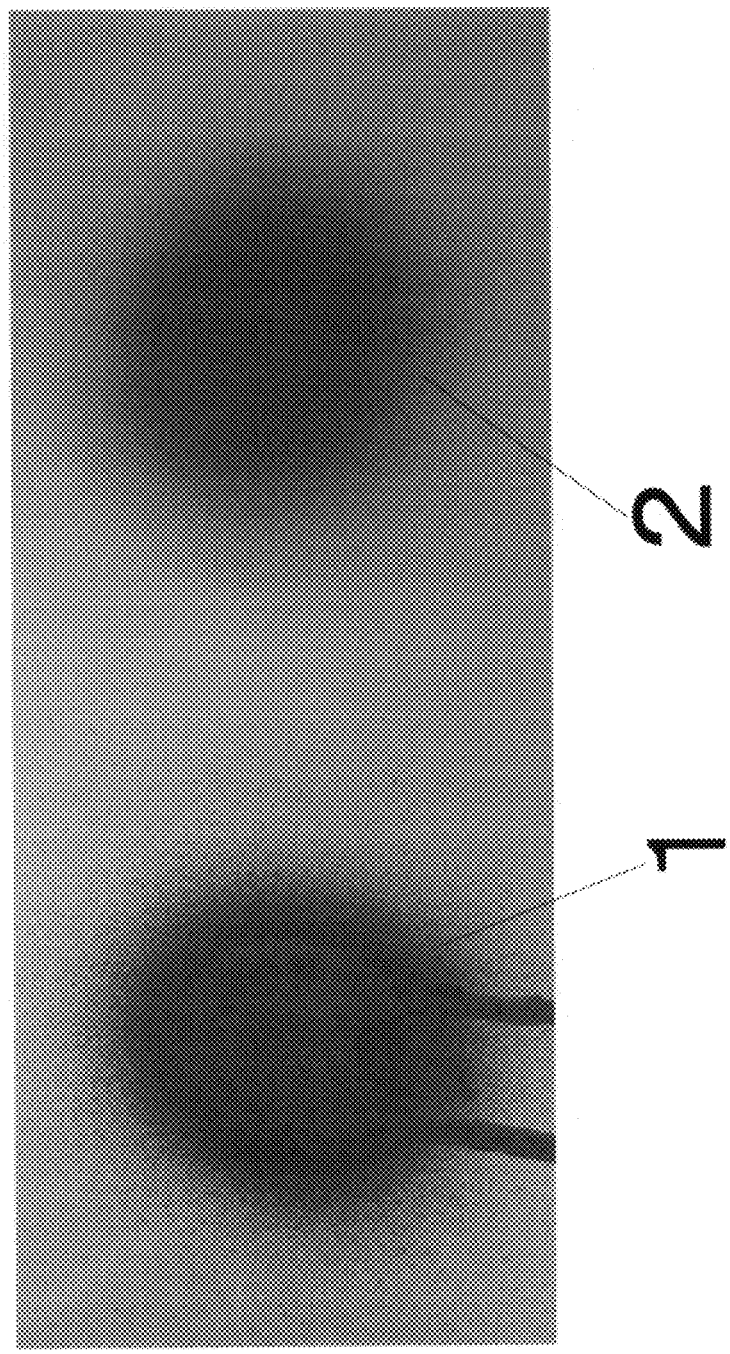
FIG. 7 is a photograph showing the appearance after blackening treatment on the surface of a vertical stainless plate. 1 shows the appearance after blackening treatment using a conventional product, and 2 shows the appearance after blackening treatment using the blackening agent of Example 1.

FIG. 7 is a photograph showing the appearance after blackening treatment on the surface of a vertical stainless plate. 1 shows the appearance by a conventional product, and 2 shows the appearance by the multilayered graphene dispersion of Example 1. Black Lube (manufactured by Audec Corporation) was used as the conventional product.

Next, application to the measurement of thermal diffusivity (a, unit: mm$^2$/s) of a metal material as a blackening agent for thermophysical property measurement was verified by comparison with the conventional product. The thermal diffusivity of a material is an intrinsic material property characterizing unstable thermal conduction. This value represents how fast the material responds to a temperature change. The measurement of thermal diffusivity was carried out using a flash analyzer (LFA 467 HT Hyper-Flash, Netzsch Japan Co., Ltd.). Measurement conditions: Position: C, Spotsize/mm: 12.7, Filter/%: O, Sensor: MCT (HgCdTe), Lamp: LFA 467 HyperFlash, Purge 2 MFC: HELIUM, Protective MFC: HELIUM In the blackening treatment, the multilayered graphene dispersion of Example 3 was used. For comparison, Graphit 33 (manufactured by CRC Industries Europe, Belgium) widely used for blackening treatment in thermophysical property measurement was used as the conventional product.

Application Example 1

Blackening treatment was conducted on both sides of a copper test piece having a thickness of 1.218 mm and a diameter of 25.200 mm by using the multilayered graphene dispersion of Example 3, and then the thermal diffusivity was measured. The average value of the results of three measurements was 116.506±0.118 mm$^2$/s (298.7K). Meanwhile, blackening treatment was conducted by using a conventional product, and then the thermal diffusivity was measured. The average value of the results of three measurements was 115.231±0.053 mm$^2$/s (298.6K). Since the theoretical value of the thermal diffusivity of copper is 117 mm$^2$/s (300K), it can be seen that a value close to the theoretical value of copper can be obtained in the blackening treatment according to the present invention as compared with the conventional product.

Application Example 2

Blackening treatment was conducted on both sides of a molybdenum test piece having a thickness of 0.9800 mm and a diameter of 25.200 mm by using the multilayered graphene dispersion of Example 3, and then the thermal diffusivity was measured. The average value of the results of three measurements was 53.790±0.025 mm$^2$/s (298.7K). Meanwhile, blackening treatment was conducted by using a conventional product, and then the thermal diffusivity was measured. The average value of the results of three measurements was 52.878±0.307 mm$^2$/s (298.2K). Since the theoretical value of the thermal diffusivity of molybdenum is 54.3 mm$^2$/s (300K), it can be seen that a value close to the theoretical value of copper can be obtained in the blackening treatment according to the present invention as compared with the conventional product.

Application Example 3

Figure 13:
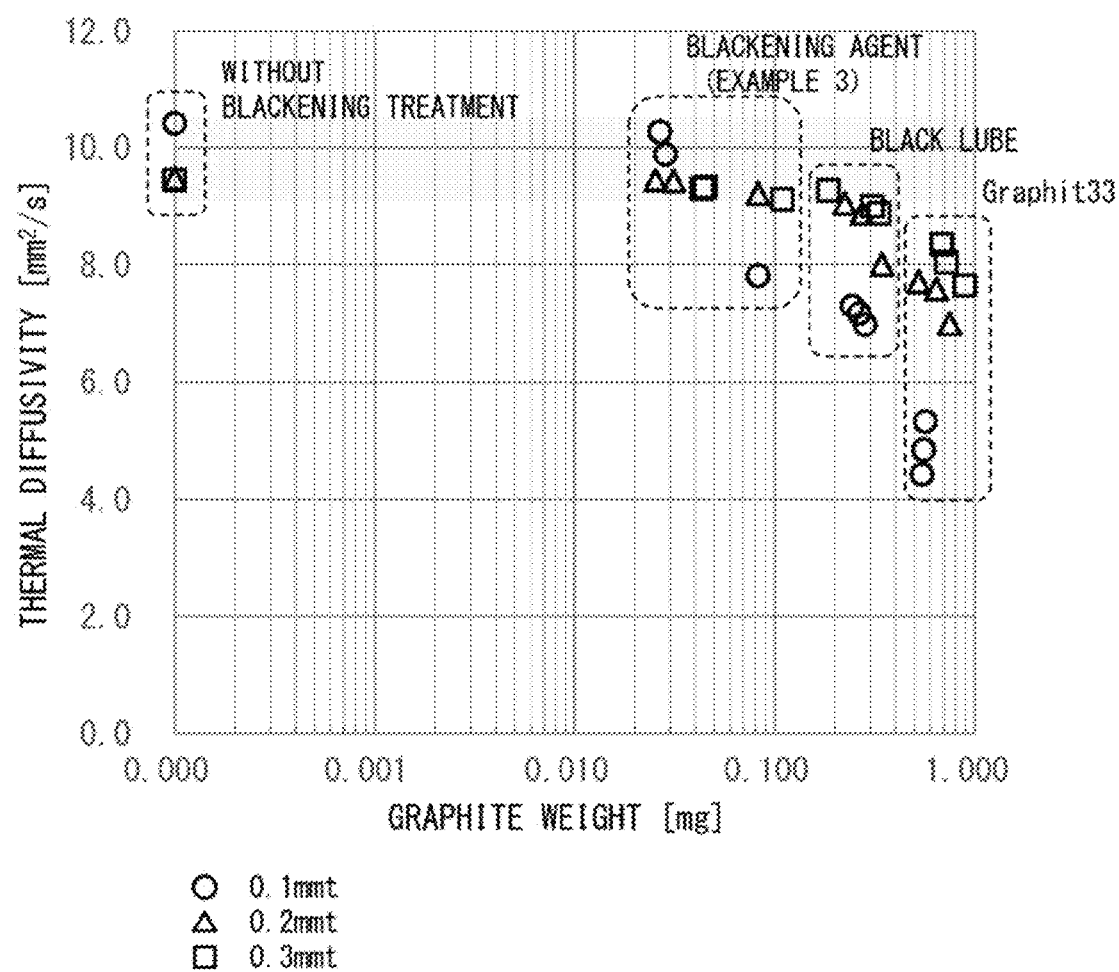
FIG. 13 is a view showing the measurement results of graphite weight and thermal diffusivity of $Al_2O_3$—TiC Ceramics surface-blackened and having different thickness. The vertical axis represents thermal diffusivity ($mm^2/s$), and the horizontal axis is logarithmic representation of graphite weight (mg).

Blackening treatment was conducted on both sides of each of test pieces having thicknesses of 0.1 mm, 0.2 mm and 0.3 mm by using the multilayered graphene dispersion of Example 3, using NPA-2 (Nippon Tungsten Co., Ltd., diameter 10 mm) having the same basic structure (material) as NMIJ CRM 5807a (Al$_2$O$_3$—TiC Ceramics), and then graphite weight and thermal diffusivity were measured (FIG. 13). For comparison, the same measurement was performed using Graphit 33 and Black Lube as conventional products (FIG. 13). From the measurement results shown in FIG. 13, in the case of a test piece having a thickness of 0.1 mm, in the conventional blackening treatment using Graphit 33 and Black Lube, the amount of graphite in blackening treatment one time (the number of spray applications on the surface of the test piece is 1 to 2 times on one side) was more than 0.1 mg, and the measured value of thermal diffusivity was 20% or more different from the literature value (9.51 mm$^2$/s). Meanwhile, when blackening treatment was conducted using the multilayered graphene dispersion of Example 3, since the amount of graphite in blackening treatment one time (the number of spray applications on the surface of the test piece was 2 to 3 times on one side) could be adjusted to be about 0.03 mg, it was found that the influence on the thermal diffusivity was minimized, and the same value as the recommended value of CRM 5807a was obtained. The correlation between CRM 5807a and NPA-2 used in this application example is separately confirmed.

When the thermal diffusivity of a thin plate or a thin film using the conventional blackening agent such as Graphit 33 or Black Lube, in order to minimize the influence on the measured value by the graphite layer, there was a demerit that a measurer requires a technique for blackening the test piece "thinly", "sparsely", and "uniformly", and versatility was low. Meanwhile, in the blackening treatment using the multilayered graphene dispersion according to the present invention, since the amount of graphene sprayed (spray-applied) at one time was smaller than that of the conventional blackening treatment agent and fine multilayered graphene was evenly applied to the surface of the sample piece without bias, it was suggested that not only the influence of graphite layer on thermal diffusivity could be minimized but also a thin plate and a thin film could be easily evaluated.

Application Example 4

Figure 14:
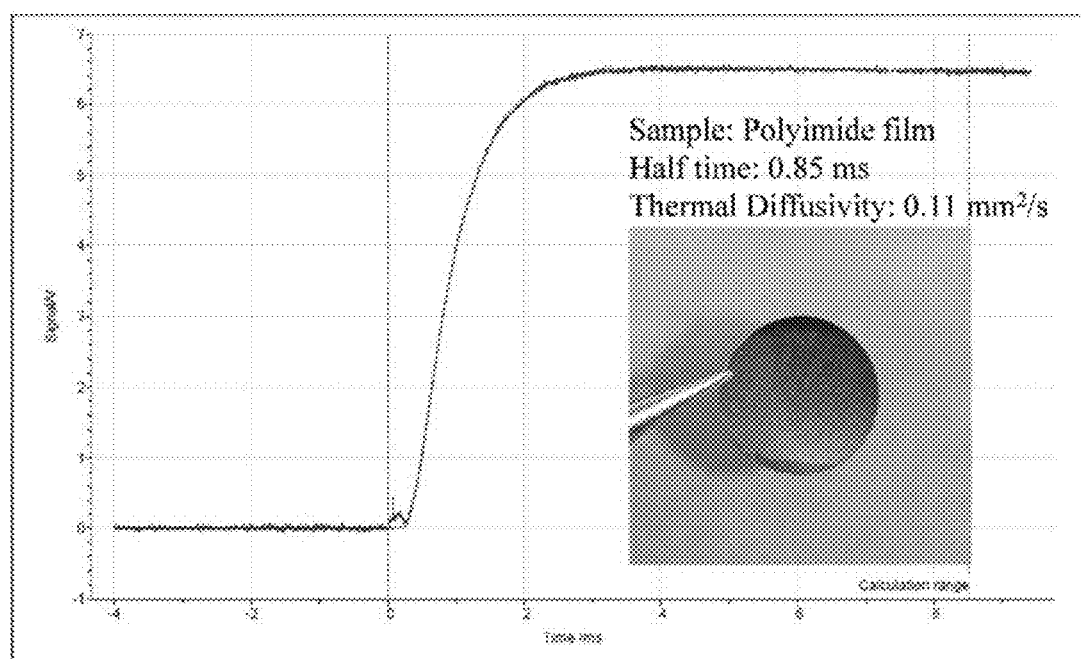
FIG. 14 is a view showing the temperature rise curve in thermal diffusion measurement of a polyimide film blackened after surface gold deposition.

Gold was deposited on both sides of a polyimide film (Kapton (registered trademark), manufactured by Du Pont-Toray Co., Ltd.) having a thickness of 25 μm and a diameter of 10 mm with an ion coater (manufactured by Eiko Engineering Co., Ltd.), blackening treatment was conducted using the multilayered graphene dispersion of Example 3, and then thermal diffusivity was measured. The average value of the results of three measurements was 0.11 mm$^2$/s (FIG. 14). From the measurement results shown in FIG. 14, since the thermal diffusivity calculated from the characteristic values (density, specific heat, thermal conductivity) described in the catalog provided by the manufacturer and the same value as the thermal diffusivity of the equivalent products with different thicknesses were obtained, it is understood that the multilayered graphene dispersion according to the present invention is also effective in evaluating an organic thin film.

[Formation of Reticular Pattern]

Figure 15:
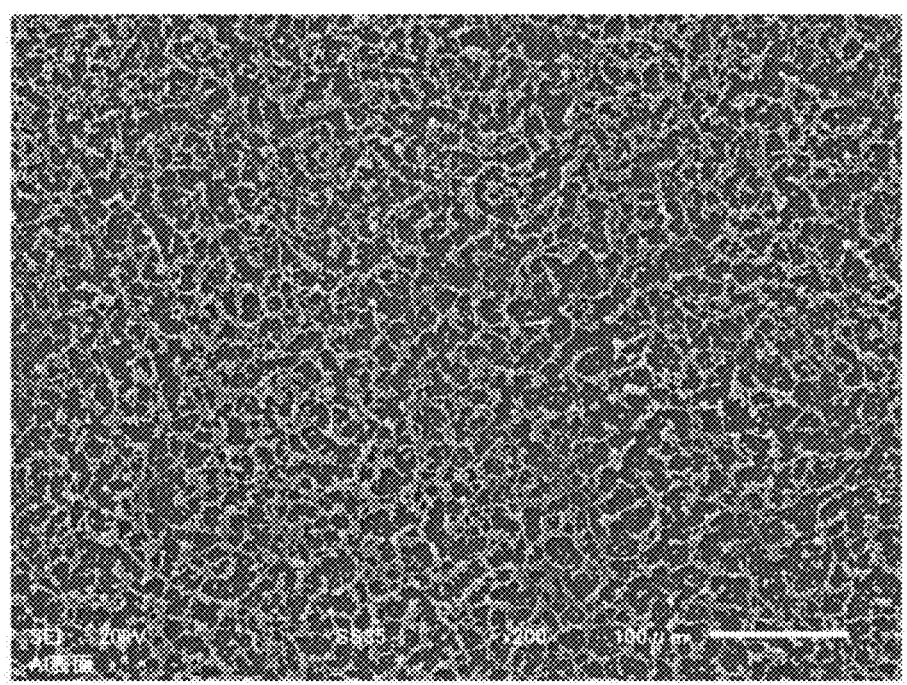
FIG. 15 is a scanning electron micrograph of a coating film obtained using the multilayered graphene dispersion of Example 3.

The coating film obtained by spraying the multilayered graphene dispersion of Example 3 toward an aluminum thin film was observed with an electron microscope (FIG. 15). It is understood that a coating film having a pattern shown in FIG. 15 can be obtained by using the multilayered graphene dispersion according to the present invention.

[Application as Mold Release Agent/Lubricant]

The use of the multilayered graphene dispersion of the present invention as a mold release agent/lubricant was attempted. As a result, it was found that the mold release agent/lubricant were also excellent. In powder sintering (for example, spark plasma sintering) in which powder raw materials are charged by manual operation, and a sintered body is extruded from a sintering mold by manual operation after sintering, since it is required to form a thin and uniform coating film in a short time, as shown in Application Example 5 below, it was confirmed from the experience of the present inventor that the multilayered graphene dispersion of the present invention is effective as a mold release agent/lubricant in powder sintering, especially in spark plasma sintering.

Application Example 5

The multilayered graphene dispersion of Example 3 was compared with Black Lube (Audec Corporation, Shinagawa-ku, Tokyo), which is often used in commercially available graphite-based mold release agents, using a graphite sintering mold for spark plasma sintering (carbon sintering mold) (NJS Co., Ltd., Yokohama City, Kanagawa Prefecture). The graphite sintering mold consists of one die and two punches. This graphite sintering mold includes a graphite sheet type mold that uses a thin graphite sheet sandwiched between the die inner wall and the punch and a mold release agent type mold in which a mold release agent is applied between the die inner wall and the punch. The graphite sheet type mold has a gap of about 0.2 mm between the die inner wall and the punch. The mold release agent type mold has a gap of 10 μm or less between the die inner wall and the punch, and it is necessary to fill this gap with a mold release agent. In this Application Example, a coating film was prepared on the inner wall of the die and the outer circumference of the punch by spraying using a mold release agent type graphite sintering mold, and a copper sintered body and an aluminum sintered body were prepared using metal copper powder and alumina powder as raw materials. As a result of repeating comparison experiments three times, it was confirmed that when the multilayered graphene dispersion of Example 3 was used, a sintered boxy was more smoothly extruded from the graphite sintering mold as compared with the case using Black Lube. In addition, it was confirmed that the amount of the black adherend, which was attached to the surface of the extruded sintered body, derived from a mold release agent in the case of using the multilayered graphene dispersion of Example 3 was smaller than that in the case of using Black Lube.

The invention claimed is:

1. A multilayered graphene dispersion wherein multilayered graphene is dispersed in a liquid phase containing an organic solvent and a liquefied gas; and
    wherein the liquefied gas is dimethyl ether (DME) and the blending mass fraction of DME in the liquid phase in which the multilayer graphene is dispersed is 60% to 90%.

2. The multilayered graphene dispersion according to claim 1, wherein the multilayered graphene has a carbon purity of 90 mass % or more and a thickness of 1 nm to 10 nm.

3. The multilayered graphene dispersion according to claim 1, wherein the multilayered graphene has an average particle diameter of 1 μm to 10 μm.

4. The multilayered graphene dispersion according to claim 1, wherein the organic solvent contains a quick-drying solvent having a boiling point of 30 to 80° C. under atmospheric pressure.

5. The multilayered graphene dispersion according to claim 1, comprising an organic polymer which is a dispersant of the multilayered graphene.

6. The multilayered graphene dispersion according to claim 1, wherein the multilayered graphene contains graphene oxide.

7. A blackening agent for thermophysical property measurement used for forming a blackened film on a surface of a sample for thermophysical property measurement, the blackening agent comprising the multilayered graphene dispersion according to claim 1.

8. The blackening agent for thermophysical property measurement according to claim 7, wherein the blackening agent is used by spraying by pressure of a gas phase containing vapor of the liquefied gas.

9. A mold release agent/lubricant for powder sintering used for forming a separation layer between a sintering mold and a sintered body in powder sintering, the mold release agent/lubricant comprising the multilayered graphene dispersion according to claim 1.

10. The mold release agent/lubricant for powder sintering according to claim 9, wherein the mold release agent/lubricant is used by spraying by pressure of a gas phase containing vapor of the liquefied gas.

11. A multilayered graphene dispersion enclosure, comprising:
a sealed container in which the multilayered graphene dispersion according to claim 1 is contained while the liquefied gas maintains vapor pressure equilibrium in a liquid phase and a gas phase;
a valve body provided in the sealed container; and
means for spraying the multilayered graphene dispersion from the sealed container by pressure of the gas phase by opening the valve body.

12. The multilayered graphene dispersion enclosure according to claim 11, wherein the multilayered graphene dispersion enclosure is used for forming a blackened film on a surface of a sample for thermophysical property measurement.

13. The multilayered graphene dispersion enclosure according to claim 11, wherein the multilayered graphene dispersion enclosure is used for forming a separation layer between a sintering mold and a sintered body in powder sintering.

14. A method for using the multilayered graphene dispersion according to claim 1 for thermophysical property measurement, comprising forming a blackened film by applying the multilayered graphene dispersion on a surface of a sample for the thermophysical property measurement.

15. A method for using the multilayered graphene dispersion according to claim 1 as a mold release agent/lubricant for powder sintering, comprising forming a separation layer between a sintering mold and a sintered body in powder sintering by applying the multilayered graphene dispersion thereto.

* * * * *